United States Patent [19]

Foster et al.

[11] Patent Number: 5,672,849
[45] Date of Patent: Sep. 30, 1997

[54] PATIENT WEIGH SCALE

[75] Inventors: L. Dale Foster; Ryan Anthony Reeder, both of Brookville, Ind.

[73] Assignee: Hill-Rom Company, Inc., Batesville, Ind.

[21] Appl. No.: 221,748

[22] Filed: Mar. 31, 1994

[51] Int. Cl.[6] .......................... G01G 19/52; G01G 21/22
[52] U.S. Cl. ............................................. 177/144; 177/263
[58] Field of Search ................................ 177/126, 127, 177/144, 147, 263

[56] References Cited

U.S. PATENT DOCUMENTS

| | | | |
|---|---|---|---|
| 1,992,262 | 2/1935 | Upp | 177/132 |
| 2,990,899 | 7/1961 | Bella | 177/144 |
| 3,596,725 | 8/1971 | Homs | 177/132 |
| 3,795,284 | 3/1974 | Mracek et al. | 177/132 |
| 3,876,018 | 4/1975 | Mracek et al. | 177/132 |
| 4,006,789 | 2/1977 | Stultz et al. | 177/132 |
| 4,033,420 | 7/1977 | De Masters | 177/132 |
| 4,281,730 | 8/1981 | Swersey et al. | 177/132 |
| 4,420,052 | 12/1983 | Hale | 177/263 X |
| 4,482,783 | 11/1984 | Laimins | 177/132 |
| 4,487,276 | 12/1984 | Swersey et al. | 177/132 |
| 4,793,428 | 12/1988 | Swersey | 177/132 |
| 5,033,563 | 7/1991 | Brainerd, Jr. et al. | 177/147 |
| 5,319,817 | 6/1994 | Hay et al. | 177/144 X |

*Primary Examiner*—Michael L. Gellner
*Assistant Examiner*—Randy W. Gibson
*Attorney, Agent, or Firm*—Barnes & Thornburg

[57] ABSTRACT

A patient weigh scale comprises a base, an upright support pole mounted to the base, and a cantilever boom pivotally mounted on one end to an upper end of the upright support pole. A bracing arm is pivotally mounted on one end to the upright support pole and removably secured on the other end to the cantilever boom when perpendicular to the upright support pole. A latch is rotatably mounted to the upright support pole for latching the scale to a hospital bed while allowing rotation of the scale relative to the bed about a generally vertical axis. A cross member is pivotally mounted to the other end of the boom for pivoting relative to the boom about a generally vertical axis. A pair of cantilever beam load cells are mounted on either end of the cross member and are oriented transverse to the cross member and have fixed ends mounted to the cross member and free ends. A H-frame has arms suspended from the free ends of the load cells, with the H-frame arms being for connection to lateral sides of a patient support.

26 Claims, 5 Drawing Sheets

PATIENT WEIGH SCALE

FIELD OF THE INVENTION

This invention relates generally to a patient care apparatus, and more particularly to a patient weigh scale for weighing a bedridden patient.

BACKGROUND OF THE INVENTION

Boom type sling scales have heretofore been employed for weighing of bedridden patients. Such a boom type scale has a base, an upright support pole connected to the base, and a cantilever boom connected to the upper end of the support pole. One or more cantilever beam type load cells are supported from the boom and are operatively connected to a sling for receiving a patient therein. A piston and cylinder is connected between the upright support pole and the cantilever boom. In use, the sling is placed adjacent a patient on a hospital bed, and the patient is rolled into the sling (known as "log rolling"). The sling is then operatively connected to the load cells, and the piston and cylinder is actuated to raise the boom and hence the patient up off of the hospital bed. The patient's weight is then taken. Such boom type sling scales are shown in U.S. Pat. Nos. 4,420,052; 4,482,783; and 5,033,563.

Such traditional boom type scales suffer from a number of disadvantages. These traditional boom type scales, with boom affixed generally perpendicular to the upright support pole via the fixed piston and cylinder arrangement, cannot be compactly configured for storage purposes.

In addition, such prior art boom type scales, which include casters for rolling movement of the scales, allow undesirable relative motion between the scale and the bed when weighing a patient.

Further, the so-called "log rolling" required to place a patient into a traditional sling scale consumes time and effort of care providers as well as results in somewhat rough treatment of the patient.

Still further, when a traditional sling scale is employed, the patient's heart rate tends to rise as the patient becomes squeezed in the sling and is simultaneously lifted upwardly. And by raising the patient relative to the floor, IV lines from floor supported infusion equipment can become undesirably taught leading to IV line pullout with associated deliterious effects on sutures, etc.

SUMMARY OF THE INVENTION

It has therefore been an objective of the present invention to provide a patient weigh scale which can be compactly configured for storage.

It has been another objective of the present invention to provide a patient weigh scale which eliminates relative motion between the scale and hospital bed during weighing of the patient.

It has yet been another objective of the present invention to provide a patient weigh scale and method of weighing a patient which avoids log rolling of the patient into a traditional sling scale.

It has been still another objective of the present invention to avoid IV line pullout and associated adverse effects on sutures when weighing a patient.

The stated objectives are attained by a patient weigh scale of the present invention which comprises a base, an upright support pole mounted to the base, a cantilever boom pivotally mounted to an upper end of the upright support pole, a transducer suspended from the cantilever boom for sensing the weight of a load applied to the scale, and a bracing arm pivotally mounted on one end to one of the upright support pole and cantilever boom and removably securably on the other end to the other of the pole and boom. The arm, when secured to the other of the pole and boom, fixes the boom generally perpendicular to the pole for weighing a patient, and when removed from the other of the upright support pole and boom allows the boom to fold downwardly generally parallel the pole into a compact storage position.

Preferably the bracing arm is pivotally mounted on one end to the pole, and includes a through hole on the other end alignable with a similar through hole in the boom when the boom is generally perpendicular to the pole. A pull pin is inserted through both holes for fixing the boom generally perpendicular to the pole, and is removed for configuring the scale into the compact storage configuration.

The present invention further provides a weigh scale comprising a base, an upright support pole mounted to the base, a cantilever boom mounted on one end to an upper end of the upright support pole, a transducer suspended from the cantilever boom for sensing the weight of a load applied to the scale, and a latch mounted to one of the base and pole for removably securing the scale to a hospital bed while weighing a patient. The latch secures the weigh scale to the bed and prevents relative movement between the scale and the bed during patient weighing.

The latch preferably comprises a latch block, a latch finger pivotally mounted to the block for pivoting about a pivot axis, the latch finger projecting forwardly of the pivot axis, and a foot actuatable pedal fixedly secured to the latch finger and projecting rearwardly of the pivot axis. The pedal is operable to pivot the latch finger upwardly out of engagement with a hospital bed base mounted latch bar when depressed.

The latch block is preferably rotatably mounted to the pole, such that when the scale is latched to the hospital bed, the scale may be rotated about a generally vertical axis relative to the bed to align the scale with the bed.

The scale further includes a cross member pivotally mounted to the other end of the boom for pivoting about a generally vertical axis relative to the boom, with the transducer being suspended from the cross member. When the scale is latched to the hospital bed, the cross member and transducer may be rotated about a generally vertical axis relative to the boom to align the transducer with the bed.

In the preferred configuration of the patient weigh scale of the present invention, a pair of transducers are mounted on either end of the cross member for sensing the weight of a load applied to the scale. The transducers are preferably cantilever beam type load cells oriented transversely to the cross member and having fixed ends mounted to the cross member and free ends laterally spaced from the fixed ends. An H-frame is suspended from the load cells, with the free ends of the load cells being attached to the arms of the H-frame, and the ends of the H-frame arms being for connection to lateral sides of a patient support.

The present invention is further predicated upon a method of weighing a patient atop a patient support, the patient support being mounted on a raisable and lowerable frame on the hospital bed. The method comprises providing a patient weigh scale having a base, an upright support pole mounted to the base, a cantilever boom mounted to an upper end of the upright support pole, a transducer suspended from the cantilever boom for sensing the weight of a load applied to the scale and a display; connecting the transducer to lateral sides of the patient support; lowering the frame out from under the patient support; and noting the patient weight on the display.

The method may further include the step of removably securing the scale to the hospital bed prior to connecting the transducer to the support to prevent relative movement between the scale and the bed during patient weighing.

The method may still further include the step of rotating the scale about a generally vertical axis relative to the bed to align the scale with the bed after removably securing the scale to the bed and prior to connecting the transducer to the support.

The method may yet further include the step of rotating the transducer about a generally vertical axis relative to the boom to align the transducer with the bed after removably securing the scale to the bed and rotating the scale relative to the bed and prior to connecting the transducer to the support.

One advantage of the present invention is that a patient weigh scale is provided which can be compactly configured for storage purposes.

Another advantage of the present invention is that a patient weigh scale is provided which conveniently docks to a hospital bed thereby eliminating relative movement between the bed and the scale during patient weighing.

Yet another advantage of the present invention is that a method of patient weighing is provided which avoids log rolling a patient into a traditional sling scale.

Still another advantage of the present invention is that a patient is not lifted from a mattress with a sling with the normally attendant adverse consequences on IV lines, sutures and heart rate. Rather, the bed frame is simply lowered from underneath the rigid patient support and the patient's weight is taken. The IV lines connected from floor supported IV equipment to the patient remain slack and there is no increase in the patient's heart rate.

These and other objects and advantages of the present invention will become more readily apparent during the following detailed description taken in conjunction with the drawings herein in which:

DETAILED DESCRIPTION OF THE INVENTION

Figure 1:
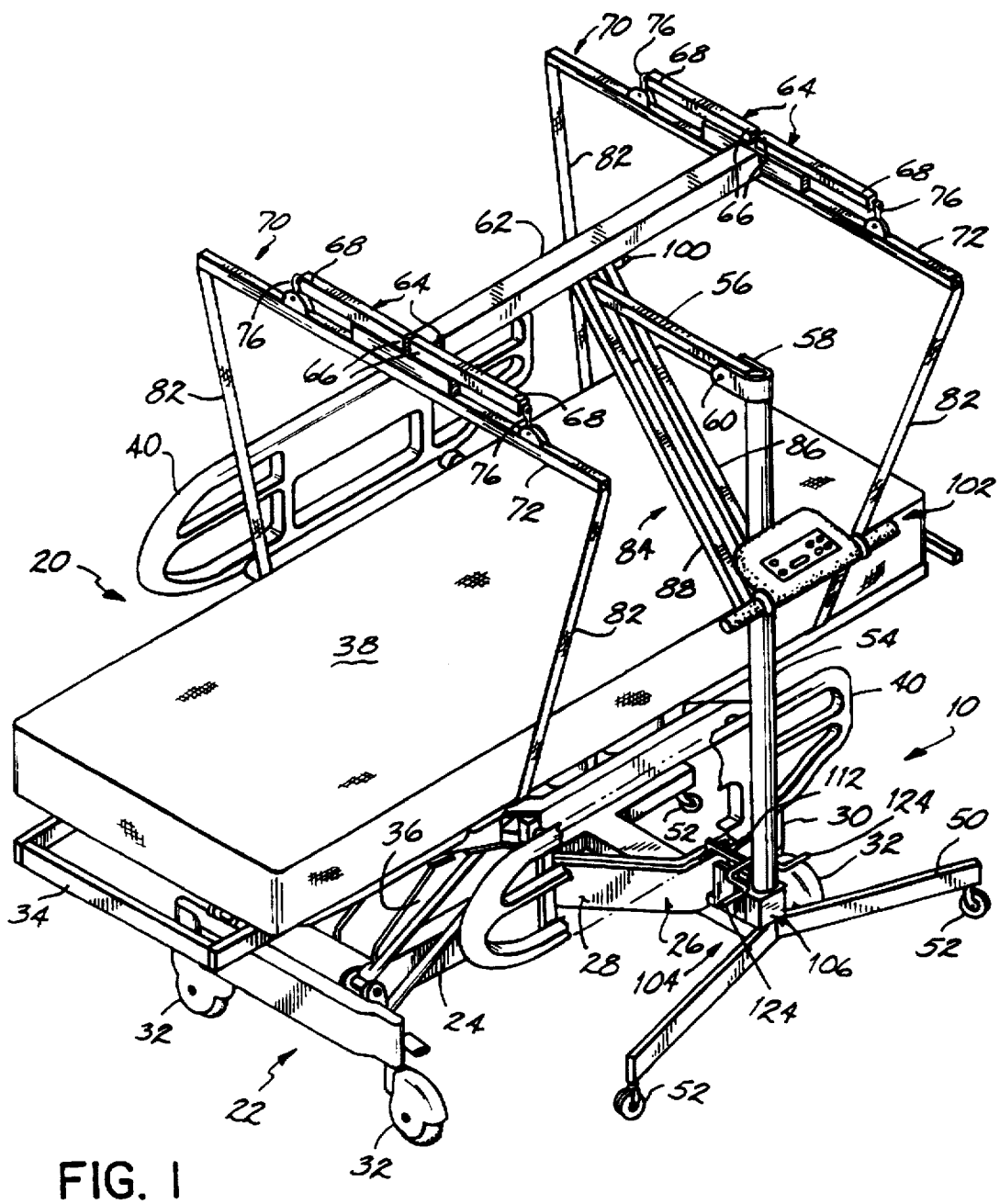
FIG. 1 is a perspective view of the patient weigh scale of the present invention docked to a hospital bed.

With reference first to FIG. 1, there is illustrated a patient weigh scale 10 according to the present invention. The patient weigh scale 10 is shown removably secured to a hospital bed 20 having a base 22 which includes a longitudinal stem portion 24 a pair of outspread arms at one end of the stem portion, one of which is shown at 26, each arm 26 having an outwardly diverging portion 28 and a longitudinal portion 30, casters 32, frame 34 mounted for vertical movement relative to the base 22 via linkage 36, a patient support 38 supported by the frame 34 and raisable and lowerable sideguards 40. While scale 10 is shown removably secured to a particular side of bed 20, it will be appreciated that scale 10 could just as easily be removably secured to the other side of bed 20, and preferably bed 20 would be so equipped to allow for ambidextrous docking of scale 10 thereto. Patient support 38 is preferably substantially rigid so that when a patient supported by support 38 is suspended from scale 10, support 38 remains generally planar and does not "hammock" as traditional slings do.

Referring now to all the Figures, the patient weigh scale 10 includes a base 50 having casters 52, an upright support pole 54 mounted to the base 50, and a cantilever boom 56 pivotally mounted to an upper end of the upright support pole 54 via a bracket 58 and pin 60, which pin 60 provides a vertical swinging axis for boom 56.

Figure 9:
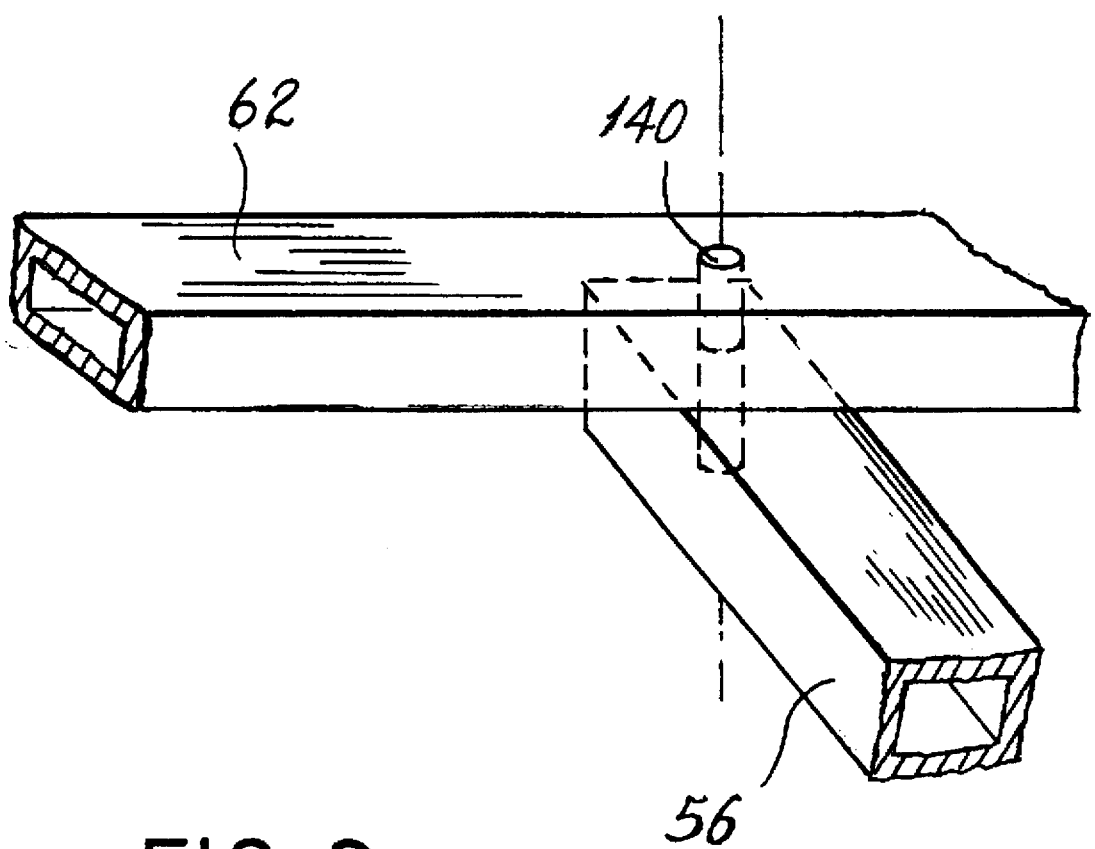
FIG. 9 is a side view showing a schematic pivotal mounting between the crosspiece and boom.

A cross piece or member 62 is pivotally mounted to an outer end of the cantilever boom 60 for rotational movement about a generally vertical axis when the boom 56 is generally horizontal or perpendicular to the upright support pole 54 (FIG. 7 and FIG. 9) and as shown schematically by the rotation pin 140. At the ends of the cross member 62 there are mounted a pair of load cells 64, 64. Each load cell 64 has a fixed end 66 fixed to an end of the cross member 62 and a free end 68. The load cells 64 awe of the cantilever beam type. Suspended from the free ends 68 of the cantilever beam type load cells 64 is an H-frame 70 including arms 72, 72 and a connecting member 74. The free end 68 of the cantilever beams 64 are connected to the arms 72, 72 of the H-frame via links 76 and pins or other suitable fasteners 78, 80. Straps or other means 82 are provided for connecting the H-frame 70 to the lateral sides or edges of the patient support 38 and may in fact form a part of the patient support 38.

Figures 2, 3, 4:
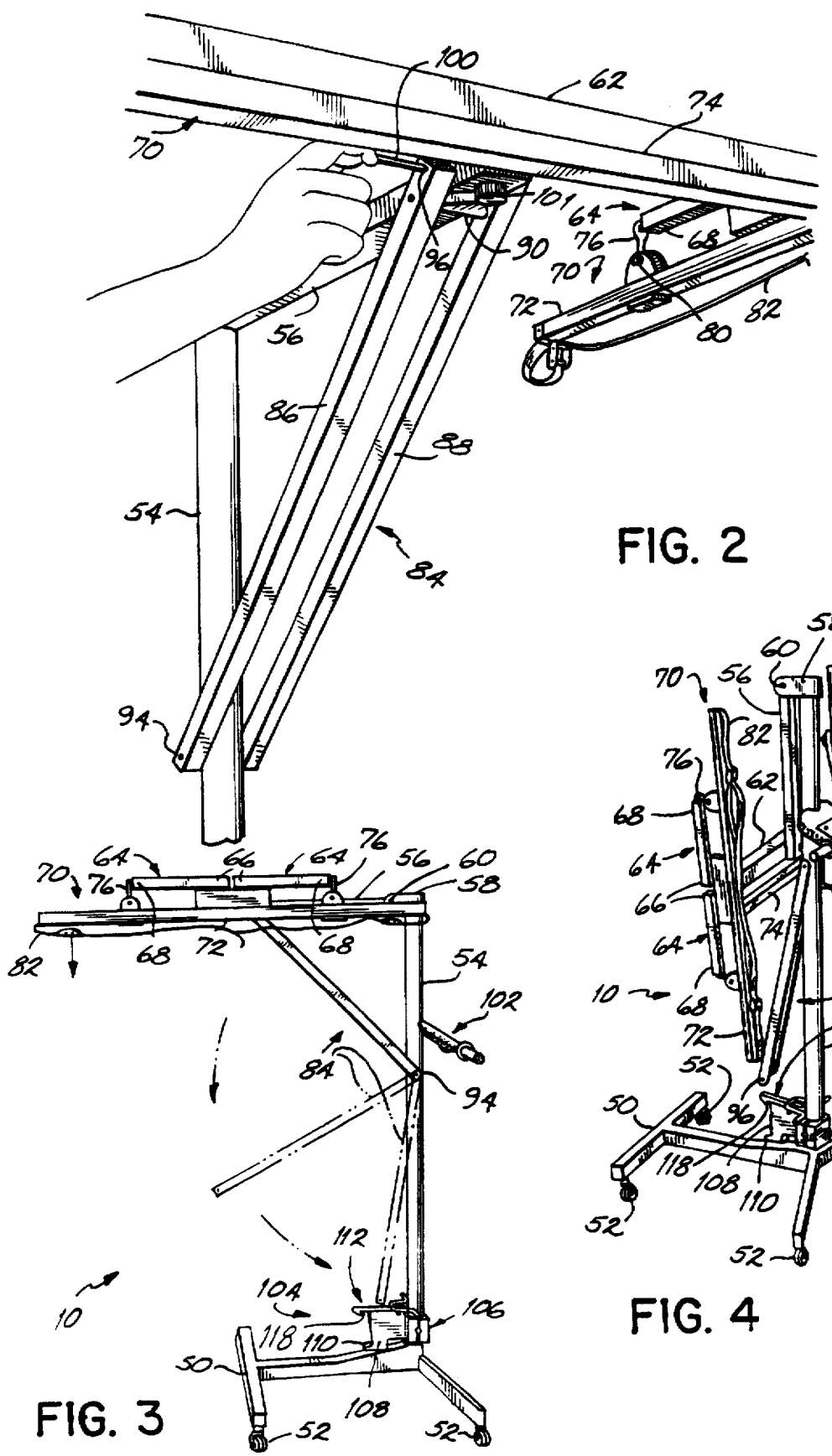
FIG. 2 is a perspective view of the bracing arm of the weigh scale.
FIGS. 3 and 4 illustrate the weigh scale being compactly configured for storage.
Figure 5:
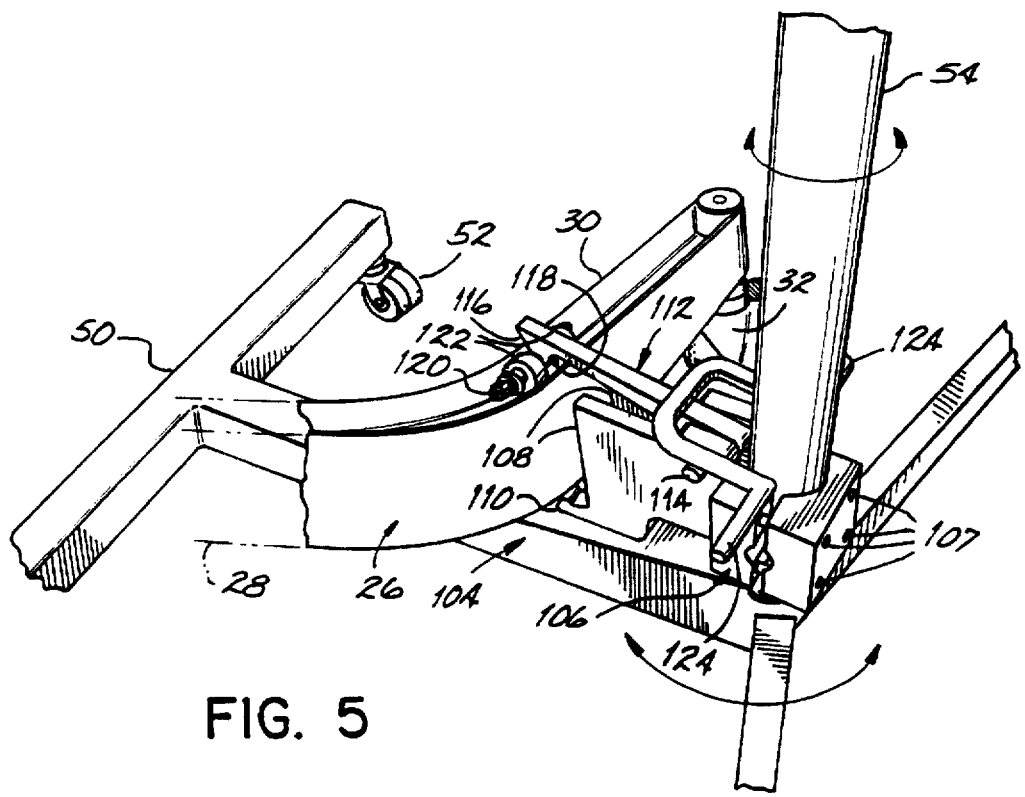
FIG. 5 is a perspective view of the latch mechanism of the weigh scale.
Figure 8:
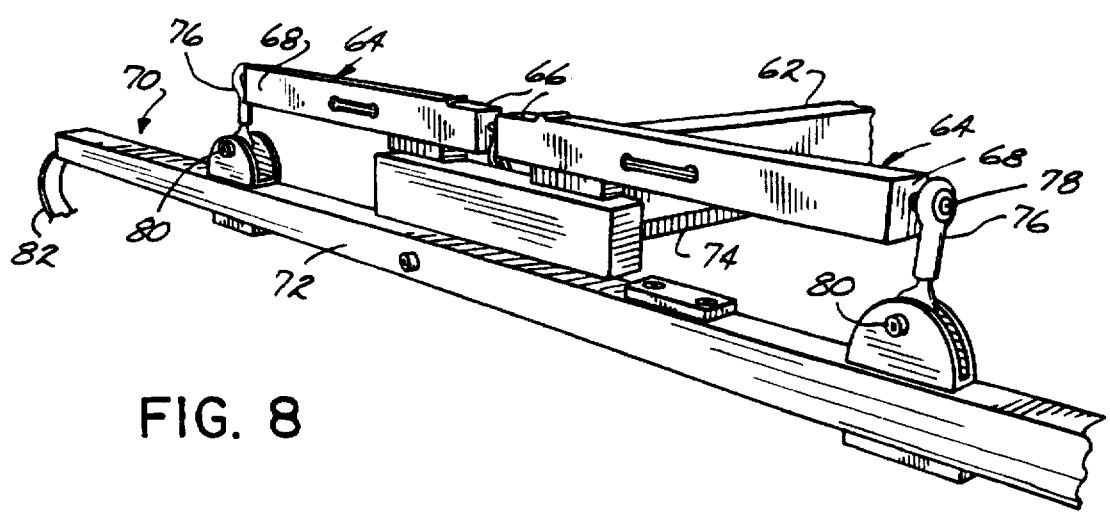
FIG. 8 is a perspective view of the load cell mounting arrangement.

The bracing arm 84 includes sides 86 and 88 connected at one end by connector 90. At the lower end the bracing arm 84 is pivotally connected to the upright support post 54 via pivot 94. The upper ends of each arm 86 and 88 of the bracing arm 84 include through holes, one of which is shown at 96, which align with a similar through-hole (not shown) in the cantilever boom 56 when the boom 56 is generally perpendicular to the upright support pole 54. A pull pin 100 is removably securable through the holes for fixing the boom 56 in a general perpendicular relationship to the upright support pole 54 for weighing the patient, and may be removed from the bracing arm 84 and cantilever boom 56 thereby enabling the boom to fold downwardly into a generally parallel relationship with the pole 54 and into a compact storage position for storage purposes (FIGS. 3 and 4). Alternatively, the connector 90 can act as a pivot (similarly to pivot 94 in FIG. 2) with the pivot 94 becoming a pull pin aligned with holes in the sides 86 and 88 and pole 54 whereby the bottom end of the bracing arm can be disconnected and left to dangle from the boom 56 when the boom 56 is placed in the collapsed position. A knob 101 is mounted to the underside of the boom 56 against which connector 90 of arm 84 may be braced while inserting pin 100.

A combined handlebar and operator input/output display and entry device 102 is connected to the upright support pole 54. The handlebar aids in steering the scales, while the display and keypad entry device is for taking the weight of the patient, etc.

Figure 6:
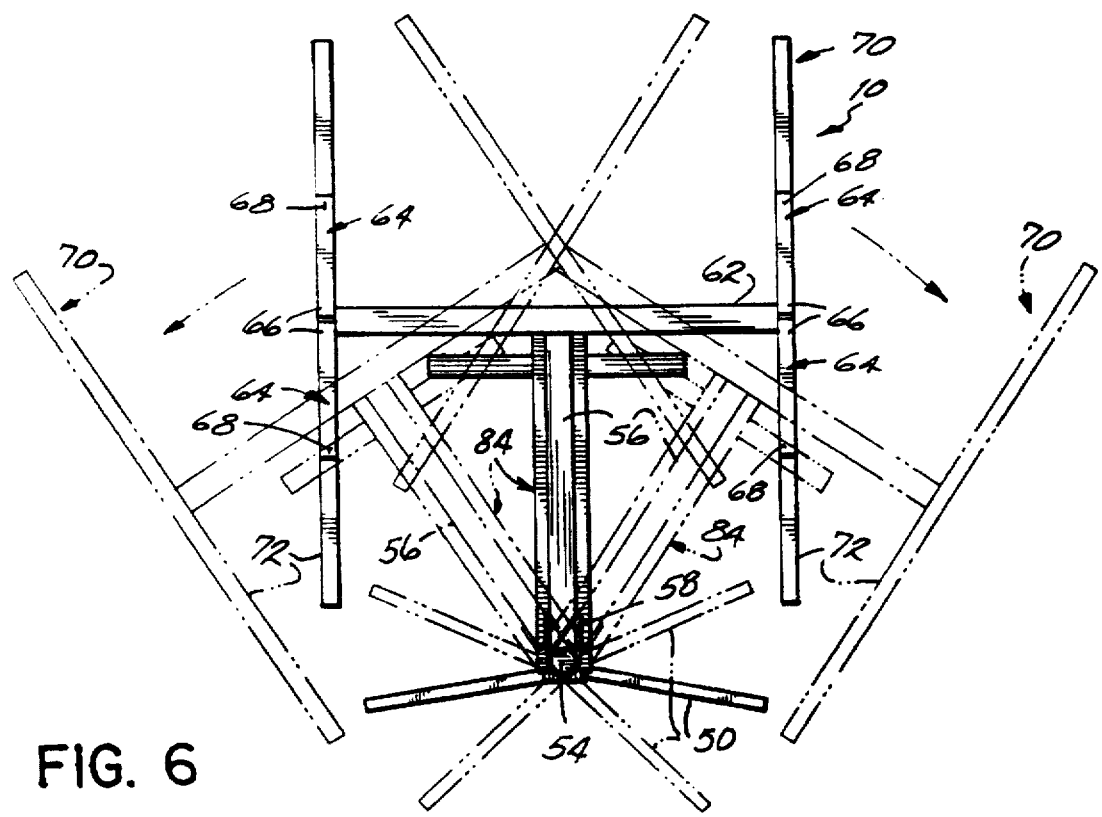
FIGS. 6 and 7 illustrate the rotational adjustability of the entire weigh scale and load cell, respectively.

A latch 104 is mounted to the scales 10 and is for latching the scale 10 to the bed 20 so that during weighing of the patient supported by the bed there will be no relative movement between the scale 10 and bed 20. The latch 104 includes a split latch block 106 which encircles the upright support pole 54 and which is adjustably securable to the upright support pole 54 by conventional fasteners 107 so as to allow the pole 54 to rotate within the latch block 106. The block rests on the base 50. The fasteners 107 can be tightened to the point where the block 106 tightly grips and rotates with the pole 54. A pair of vertically planar plates 108, 108 are connected to the block 106 and project forwardly therefrom. The plates 108, 108 include a forwardly projecting lip 110 which resides beneath the lower edge of the portion 30 of the arm 28 when the scale 10 is docked to the bed 20. A pivoting latch finger 112 is pivoted to the upper portion of the plates 108, 108 via a pin 114 which defines a pivot axis. The latch finger 112 projects forwardly of the pivot axis and includes a ramped lower forward edge 116 forming a hook 118 therebehind. Ramp 116 is operable to ride upwardly and over a latch bar or pin 120 secured to a pair of ears 122, 122 which are mounted on the arm 26. A pair of rearwardly projecting foot pedals 124, 124 are connected to the latching finger 112. Depressing either of the foot pedals 124 causes the latching finger 112 to pivot upwardly about the pivot axis defined by pivot pin 114. Thus as the scale 10 is rolled against the bed base 22, lip 110 rides underneath of portion 30 of arm 26, latch is latching finger 112 rides upwardly and over pin 120 and snaps downwardly thereover to secure the scale 10 to the bed 20. The entire scale may then be rotated about a vertical axis within the block 106 (FIG. 6).

In use, the scale 10 is removed from its storage location, and the boom 56 is pivoted upwardly to a position generally perpendicular the upright support pole 54. Bracing arm 84 is then pivoted upwardly and connector 90 is placed behind knob 101; holes 96 are thus aligned with the holes in the boom 56. Pin 100 is then inserted therethrough fixing the boom in the horizontal operable position. The scale 10 is then rolled toward the hospital bed 20 via the handlebar 102 which supports the patient desired to be weighed. The base 50 is directed up towards the hospital bed base 22 so as to roll beneath the outspread arm 26. The latching finger 112 of the latch mechanism 104 is then aligned so as to pass between the lugs 122, 122 and to ride upwardly and over the latch pin or bar 120, while simultaneously the lip 110 of the plates 108, 108 travels beneath the arm 26.

Figure 7:
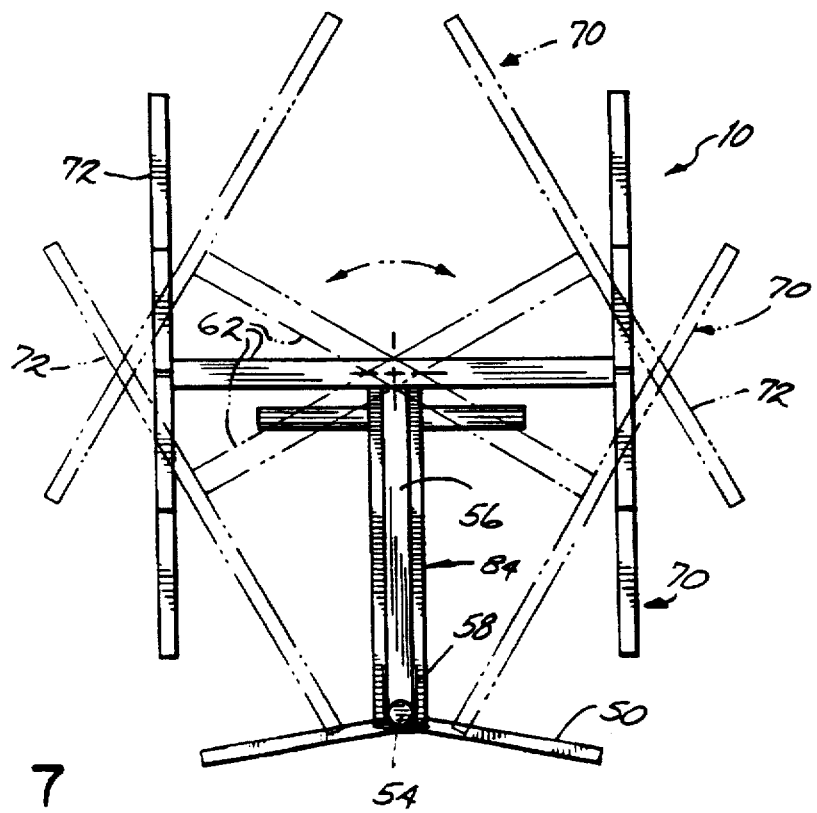

Once the latch assembly 104 secures the scale 10 to the bed 20, the entire scale 20 may be rotated about a vertical axis (FIG. 6) so as to position the end of the boom 56 generally over the center of mass of a patient supported by the patient support 38. Once this is done, it may be necessary to rotate the cross member 62, load cells 64 and H-frame 70 relative to the boom 56 so as to square up that entire assembly relative to the patient support 38 (FIG. 7).

Once that is done, the straps or fastening means 82 are connected between the lateral sides or edges of the patient support 38 and the ends of the arms 72 of the H-frame 70. Next the frame 34 of the bed 20 is lowered via the frame mounting linkage 36 such that the patient support 38 is no longer supported by the frame 34, but is suspended entirely from the patient scale 10. At this point the patient's weight may be taken from the display 102.

Once the weight of the patient has been taken, the frame 34 is raised upwardly so as to support the patient atop the patient support 38. The straps 82 are disconnected, one of the pedals 124 is depressed so as to unlatch the scale 10 from the bed base 22, and the scale is then rolled via the handlebar 102 to its storage location, at which time pin 100 is withdrawn, arm 84 is pivoted downwardly and boom 56 with cross member 62 and H-frame 70 are pivoted downwardly into the compact storage position wherein the boom 56 is generally parallel the upright support pole 54.

The use of four load cells 64 substantially increases the accuracy of the scale 10 over prior art scales which traditionally employ only two load cells. Further, by employing a substantially rigid patient support 38 which remains generally planar even when suspending a patient from scale 10, orienting the load cells transversly to the patient support, suspending the H-frame 70 from the load cells and attaching the support to the ends of the arms 72 of the H-frame the "hammocking" tendency characteristic of prior art scales and slings is substantially reduced or eliminated, thus obviating the undesired raising of the patient's heart rate. Further, since the patient support remains at the same height relative to the floor during weighing, IV line pullout etc. does not occur as floor supported infusion equipment remains a fixed distance to the patient during weighing contrary to prior weighing methods which utilize raisable and lowerable boom scales.

Those skilled in the art will readily recognize numerous adaptations and modifications which can be made to the patient weigh scale of the present invention all of which will fall within the spirit and scope of the invention as defined in the following claims. Accordingly, the invention is to be limited only by the scope of the claims and their equivalents.

What is claimed is:

1. A patient weigh scale comprising:

a base;

an upright support pole mounted to said base;

a cantilever boom pivotally mounted to an upper end of said upright support pole;

a transducer suspended from said cantilever boom for sensing the weight of a load applied to said scale; and a bracing arm pivotally mounted on one end to one of said upright support pole and cantilever boom and removably securable on the other end to the other of said pole and boom, said arm when secured to said other of said pole and boom fixing said boom generally perpendicular to said pole for weighing a patient and when removed from the other of said upright support pole and boom allowing said boom to fold downwardly generally parallel said pole into a compact storage position.

2. The patient weigh scale of claim 1 wherein said bracing arm is pivotally mounted on one end to said pole, said bracing arm including a through hole on the other end alignable with a similar through hole in said boom when said boom is generally perpendicular to said pole, said scale further including a pull pin for removable securement into both said through holes for fixing said boom generally perpendicular to said pole.

3. A patient weigh scale comprising:

a base;

an upright support pole mounted to said base;

a cantilever boom mounted on one end to an upper end of said upright support pole;

a transducer suspended from said cantilever boom for sensing the weight of a load applied to said scale; and a latch mounted to one of said base and pole for removably securing said scale to a hospital bed while weighing a patient to prevent relative movement between said scale and the bed during patient weighing.

4. The patient weigh scale of claim 3 wherein said latch comprises:

a latch block;

a latch finger pivotally mounted to said block for pivoting about a pivot axis, said latch finger projecting forwardly of said pivot axis; and a foot actuatable pedal fixedly secured to said latch finger and projecting rearwardly of said pivot axis, said pedal being operable to pivot said latch finger upwardly out of engagement with a hospital bed base mounted latch bar when depressed.

5. The patient weigh scale of claim 3 wherein said latch is rotatably mounted to one of said base and pole, whereby when said scale is latched to the hospital bed said scale may be rotated about a generally vertical axis relative to the bed to align said scale with the bed.

6. The patient weigh scale of claim 4 wherein said latch block is rotatably mounted to said pole, whereby when said scale is latched to the hospital bed said scale may be rotated about a generally vertical axis relative to the bed to align said scale with the bed.

7. The patient weigh scale of claim 3 further comprising:

a cross member pivotally mounted to the other end of said boom for pivoting about a generally vertical axis relative to said boom;

said transducer being suspended from said cross member, whereby when said scale is latched to the hospital bed said cross member and transducer may be rotated about a generally vertical axis relative to said boom to align the transducer with the bed.

8. A patient weigh scale comprising:

a base;

an upright support pole mounted to said base;

a cantilever boom mounted on one end to an upper end of said upright support pole;

a cross member mounted to the other end of said boom;

a pair of transducers mounted on either end of said cross member for sensing the weight of a load applied to said scale; and wherein said transducers are cantilever beam type load cells oriented transversely to said cross member and having fixed ends mounted to said cross member and free ends laterally spaced from said fixed ends.

9. The patient weigh scale of claim 8 further including an H-frame suspended from said load cells, said free ends of said load cells being attached to arms of said H-frame, the ends of said arms for connection to lateral sides of a patient support.

10. A patient weigh scale comprising:

a base;

an upright support pole mounted to said base;

a cantilever boom pivotally mounted on one end to an upper end of said upright support pole;

a bracing arm pivotally mounted on one end to said upright support pole and removably securable on the other end to said cantilever boom;

a latch rotatably mounted to said upright support pole for latching said scale to a hospital bed and allowing rotation of said scale relative to the bed about a generally vertical axis;

a cross member pivotally mounted to the other end of said boom for pivoting relative to said boom about a generally vertical axis;

a pair of cantilever beam load cells mounted on either end of said cross member oriented transverse to said cross member having fixed ends mounted to said cross member and free ends; and an H-frame having arms suspended from said free ends of said load cells, said H-frame arms for connection to lateral sides of a patient support.

11. Apparatus comprising:

a hospital bed having a base, a frame mounted above said base and a patient support supported atop said frame;

a latch bar mounted to said bed base;

a patient weigh scale having a base, an upright support pole mounted to said base, a cantilever boom mounted on one end to an upper end of said support pole and a transducer suspended from said cantilever boom for sensing the weight of a load applied to said scale; and a latch mounted to said scale which cooperates with said bed base latch bar for removably securing said scale to said bed.

12. The apparatus of claim 11 wherein said bed base has a longitudinal stem and a pair of outspread arms connected to an end of said stem, each outspread arm having an outwardly diverging portion and a longitudinal portion, said latch bar being mounted to said longitudinal portion of one of said outspread arms.

13. The apparatus of claim 11 wherein said scale further includes a bracing arm pivotally mounted on one end to said upright support pole and removably secured on the other end to said boom with a pull pin.

14. The apparatus of claim 11 wherein said latch comprises:

a latch block;

a latch finger pivotally mounted to said block for pivoting about a pivot axis, said latch finger projecting forwardly of said pivot axis; and a foot actuatable pedal fixedly secured to said latch finger and projecting rearwardly of said pivot axis, said pedal being operable to pivot said latch finger upwardly out of engagement with said hospital bed base mounted latch bar when depressed.

15. The apparatus of claim 14 wherein said latch block is rotatably mounted to said pole, whereby when said scale is latched to the hospital bed said scale may be rotated about a generally vertical axis relative to said bed to align said scale with said bed.

16. The apparatus of claim 11 wherein said weigh scale further comprises:

a cross member pivotally mounted to the other end of said boom for pivoting about a generally vertical axis relative to said boom;

said transducer being suspended from said cross member, whereby when said scale is latched to said hospital bed said cross member and transducer may be rotated about a generally vertical axis relative to said boom to align said transducer with said bed.

17. The apparatus of claim 11 wherein said weigh scale further includes a cross member mounted on the other end of said boom and a pair of transducers mounted on either end of said cross member for sensing the weight of a load applied to said scale.

18. The apparatus of claim 17 wherein said transducers are cantilever beam type load cells oriented transversely to said cross member and having fixed ends mounted to said cross member and free ends laterally spaced from said fixed ends.

19. The apparatus of claim 18 further including an H-frame suspended from said load cells, said free ends of said load cells being attached to arms of said H-frame, the ends of said arms for connection to lateral sides of a patient support.

20. A method of weighing a patient atop a patient support, the patient support being mounted on a raisable and lowerable frame of a hospital bed, comprising the steps of:

providing a patient weigh scale having a base, an upright support pole mounted to said base, a cantilever boom mounted to an upper end of said upright support pole, a transducer suspended from said cantilever boom for sensing the weight of a load applied to said scale and a display;

connecting said transducer to lateral sides of the patient support;

lowering the frame out from under the patient support; and noting the patient weight on said display.

21. The method of claim 20 further including the step of removably securing said scale to the hospital bed prior to connecting said transducer to the support to prevent relative movement between said scale and the bed during patient weighing.

22. The method of claim 21 further including the step of rotating said scale about a generally vertical axis relative to the bed to align said scale with the bed after removably securing said scale to the bed and prior to connecting said transducer to the support.

23. The method of claim 22 further including the step of rotating said transducer about a generally vertical axis relative to said boom to align said transducer with the bed after removably securing said scale to the bed and rotating said scale relative to the bed and prior to connecting said transducer to the support.

24. A method of weighing a patient comprising the steps of:

supporting a patient atop a substantially rigid patient support;

supporting said substantially rigid patient support atop a raisable and lowerable frame of a hospital bed;

connecting said substantially rigid patient support to a weigh scale;

lowering said bed frame out from under said patient support so that said patient support and patient is suspended from said scale; and taking the weight of the patient.

25. In combination:

a hospital bed having a raisable and lowerable frame means supporting a substantially rigid patient support; and a weigh scale having an overbed portion means connectable by drop means to said patient support;

wherein when said overbed portion means of said weigh scale is rigidly connected to said substantially rigid support by said drop means and said bed frame means is lowered out from under said support, a patient supported by said patient support is weighed with no vertical relative movement of the patient relative to a supporting floor and no hammocking of the patient support.

26. The combination of claim 25 wherein said weigh scale is connectable to said bed to eliminate relative horizontal movement therebetween.

* * * * *